United States Patent [19]

Harris

[11] 3,801,906

[45] Apr. 2, 1974

[54] DIGITAL FREQUENCY METER

[75] Inventor: Thomas A. Harris, Ann Arbor, Mich.

[73] Assignee: General Motors Corporation, Detroit, Mich.

[22] Filed: Jan. 23, 1973

[21] Appl. No.: 326,052

[52] U.S. Cl. ............................................ 324/78 D
[51] Int. Cl. .......................................... G01R 23/02
[58] Field of Search ................ 324/162, 78 D, 79 D

[56] References Cited
UNITED STATES PATENTS
3,263,064   7/1966   Lindars ............................ 324/78 D Primary Examiner—Alfred E. Smith
Attorney, Agent, or Firm—Albert F. Duke

[57] ABSTRACT

A digital frequency meter is disclosed which includes a downcounter which is initialized to a state corresponding to the maximum frequency to be measured. The initialization occurs at a time equal to the period of the maximum frequency following the beginning of the period of the input signal to be measured. The downcounter is decremented from this initialized state at a rate proportional to the square of the present state of the counter. The binary output of the downcounter is sampled at the end of the period of the input signal and is converted to a voltage representing the frequency of the input signal.

3 Claims, 3 Drawing Figures

DIGITAL FREQUENCY METER

The present invention relates to frequency measuring apparatus and more particularly to a digital frequency meter which responds to changes in input frequency instantly at the termination of each input cycle and provides an output which is free of all ripple.

Prior art digital frequency meters usually include a counter which is advanced by each cycle of an input signal of unknown frequency. The state of the counter at the end of some predetermined interval of time is indicative of the frequency of the signal. The accuracy of such an instrument is dependent on the interval of time used for observing the input signal and the frequency of the signal. Since it is usually desirable for the instrument to operate as rapidly as possible, the design of prior art digital frequency meters usually involves a compromise between accuracy and speed of operation.

It is an object of the present invention to provide a digital frequency meter which responds to changes in input frequency instantly at the termination of each input cycle and provides an output which is free of all harmonics of the input signal.

It is another object of the present invention to provide frequency measuring apparatus that is particularly useful in closed loop servo systems where fast response is desirable.

Since the frequency of a periodic signal is equal to the reciprocal of the period of the signal, i.e., $f = 1/T$, the rate of change of $f$, i.e., $df/dt = -1/T^2$ or $-f^2$. In other words, the rate of change of frequency is equal to the frequency squared and is downward. In accordance with the present invention, apparatus for measuring the frequency of a periodic input signal is provided which is based on this relationship.

The frequency measuring apparatus of the present invention includes a counter and means responsive to the beginning of the period of the periodic input signal for initializing the counter to a state corresponding to the maximum frequency to be measured. The initialization occurs at a time delayed from the beginning of the period of the input signal by an amount equal to the period of the maximum frequency to be measured. Once the counter has been initialized a clocking signal decrements the counter at a rate proportional to the square of the present state of the counter. The state of the counter at any particular time represents the integral of the input rate. Accordingly, by sampling the counter at the end of the period of the input signal the frequency of the signal may be obtained.

A more complete understanding of the present invention may be had from the following detailed description which should be read in conjunction with the drawings in which.

Figure 1:
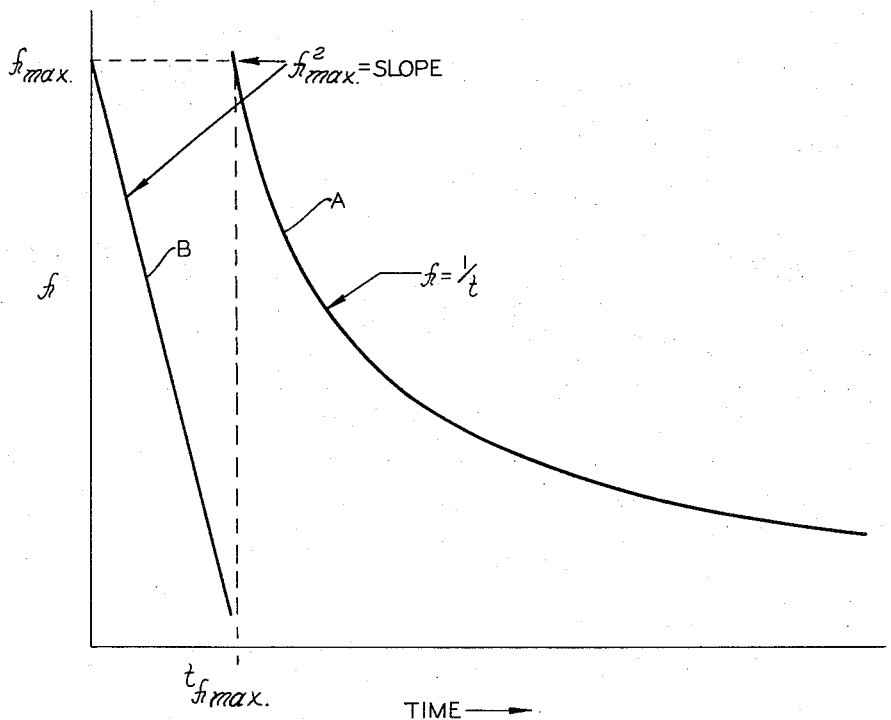
FIG. 1 is a graph of frequency vs. time which is useful in explaining the invention.
Figure 2:
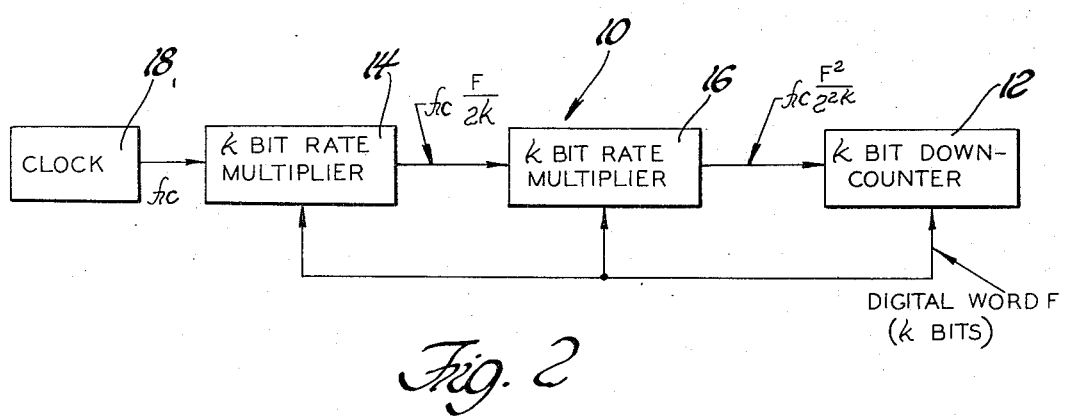
FIG. 2 is a block diagram illustrating the basic concept of the present invention.
Figure 3:
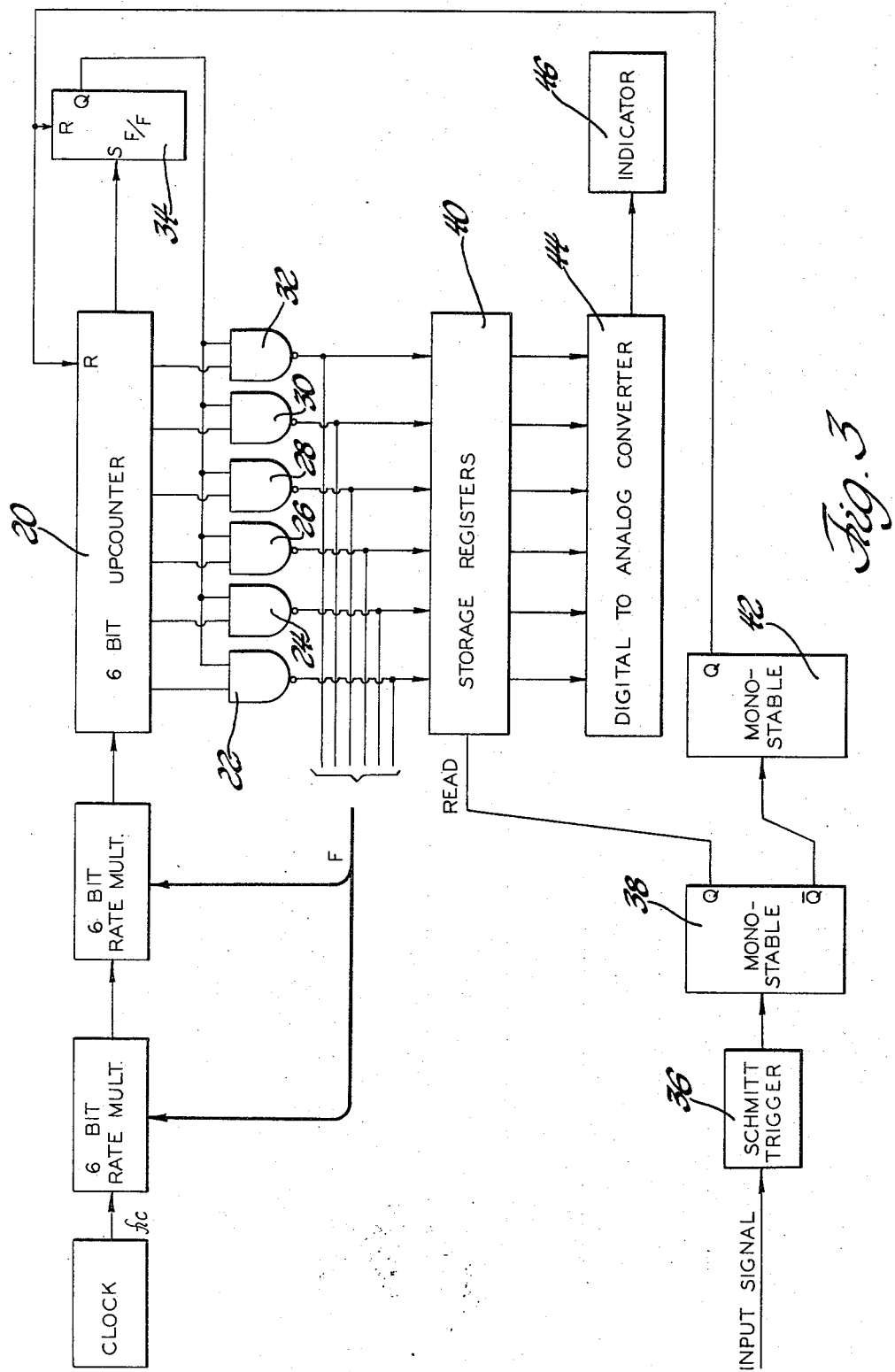
FIG. 3 is a more detailed block diagram of the frequency measuring apparatus of the present invention.

Referring now to the drawings and initially to FIGS. 1 and 2 the curve designated A is a plot of frequency vs. period which drops from a frequency approaching infinity to a frequency approaching zero. The slope of the curve A at some preselected full scale frequency reading designated $f_{max}$ is shown in curve B which crosses the time coordinate of the graph at $t_{f\,max}$ equal to the period of $f_{max}$. FIG. 2 shows a block diagram of a digital function generator for generating a binary output which follows the curve A. The function generator 10 includes a $k$ bit binary downcounter 12, the present state of which is designated $F$ and provides one input to $k$ bit rate multipliers 14 through 16 respectively. As is well known a rate multiplier is a digital logic circuit that provides a sequential pulse output whose frequency is proportional to the product of two inputs. The other input to the multiplier 14 is from a clock 18 having a clock frequency $f_c$. The other input to the multiplier 16 is from the output of the multiplier 14. The input rate to the downcounter 12 is the output of the multiplier 16 and is accordingly proportional to the square of the present state of the counter 12. By initializing the downcounter 12 at a time $t_{f\,max}$ to a state representing $f_{max}$, and thereafter decrementing the downcounter 12 at a rate proportional to the square of the present state of the downcounter 12, the state of the downcounter at the end of the period of the periodic input signal will be indicative of the frequency of the input signal. The downcounter 12 is implemented in the present invention as shown in FIG. 3 by means of an upcounter 20, the output of each state being connected as one input to NAND gates 22 through 32. In FIG. 3, $k$ is assumed to be six. The other input to the gates 22 through 32 is from a flipflop 34. The flip-flop 34 has its set input connected with the carry output of the counter 20 so that the flip-flop 34 is set and when the counter 20 switches from its terminal state of 111111 to its initial state of 000000. When the flip-flop 34 is set by the counter 20 its Q output goes high to enable the gates 22 through 32 so that after the flip-flop 34 is set the output of the gates 22 through 32 will be the complement of the state of the counter 20. Until the flip-flop 34 is set its Q output is a logic "0" so that the output of the gates 22 through 32 are each logic "1's." $f_c$ is selected so that when all "1's" are applied as the input $F$ to the multipliers 14 and 16, the counter 20 is clocked at a rate proportional to $F^2_{max}$. By NANDing the binary coded output of the upcounter 20 after the upcounter 20 has overranged itself through one cycle the NANDed code will be identical to that of a downcounter initialed to a state corresponding to $f_{max}$ at a time equal to $t_{f\,max}$.

The periodic input signal to be analyzed is applied to a Schmitt trigger 36 or other trigger circuit producing an output pulse train each pulse of which indicates the completion of one period of the input signal and the beginning of another period of the input signal. The output of the trigger 36 triggers a monostable multivibrator 38 the Q output of which controls a storage register 40 for storing the output of the gates 22 through 32 when the multivibrator 38 is triggered. When the multivibrator 38 returns to its stable state its Q output triggers a monostable multivibrator 42, the Q output of which resets the counter 20 and the flip-flop 34. The output of the register 40 provides inputs to a digital-to-analog converter 44 the output of which is a voltage representing the frequency of the input signal. The output of the converter 44 is used to drive an indicator 46. The indicator 46 may, for example, be the tachometer gauge of a motor vehicle. It will be appreciated that the binary output of the storage registers 40 could be applied to other converter means such as a binaryto-decimal converter to indicate a decimal output corresponding to the frequency of the input signal, or used as a binary digital input to additional processing apparatus such as a digital anti-skid or cruise control system.

The operation of the apparatus 1'FIG. 3 will now be described assuming that the multivibrator 42 has just been toggled and the counter 20 and the flip-flop 34 have been reset. With the counter 20 and the flip-flop 34 reset the output of the gates 22 through 32 and therefore the inputs to the rate multipliers 14 and 16 will be binary "1's." When the counter 20 has overranged itself through one cycle, i.e., at $t_{f\ max}$, the output of the gates 22 through 32 will correspond to the maximum frequency desired to be converted. The coded output of the gates 22 through 32 will thereafter follow the curve A in FIG. 1. When the input signal reaches the end of its period the multivibrator 38 is triggered causing the storage register 40 to read and store the coded output of the gates 22 through 32, which is converted to a voltage corresponding to the frequency of the input signal by the converter 44 and indicated on the indicator 46. After the time interval determined by the multivibrator 38 the upcounter 20 and the flip-flop 34 are reset and the operation is repeated. Consequently, an indication of the frequency of the periodic signal is obtained at the termination of each input cycle.

Having thus described my invention, what I claim is:

1. Apparatus for measuring the frequency of a periodic input signal comprising a downcounter, rate multiplier means responsive to a clock signal and the present state of said downcounter for providing an input rate to said downcounter proportional to the square of the present state of the downcounter, means for initializing said downcounter to a state corresponding to the full scale frequency of the apparatus and for applying said input rate to said downcounter at a time delayed from the beginning of a period of the input signal by a time interval equal to the period of said full scale frequency, and means for sensing the state of said downcounter at the end of the period of said input signal.

2. Apparatus for measuring the frequency of a periodic input signal comprising a k-bit binary upcounter, bistable switching means switchable from a first state to a second state when said upcounter overranges through one cycle, logic means for inverting the binary word stored in said upcounter, said logic means being disabled by said bistable switching means when in said first state and enabled by said bistable switching means when in said second state, clock means, first and second k-bit rate multipliers, the output of said clock means being applied to the input of said first rate multiplier, the output of said first rate multiplier being applied to the input of said second rate multiplier, the output of said logic means being applied as one input to each of said first and second rate multipliers, the output of said second rate multiplier being applied to the input of said upcounter, k-bit storage register means, trigger means responsive to said input signal for enabling said storage register means to store the output of said logic means after each period of said input signal, said trigger means including means for resetting said upcounter and resetting said flip-flop to its first state subsequent to the enabling of said storage register means, and utilization means responsive to the binary word stored in said storage register means.

3. The apparatus defined in claim 2 wherein said utilization means includes digital-to-analog converter means responsive to the binary word stored in said storage register means for providing an analog voltage output and indicator means responsive to the output of said digital-to-analog converter means for indicating the frequency of said input signal.

* * * * *

UNITED STATES PATENT OFFICE
CERTIFICATE OF CORRECTION

Patent No. 3,801,906      Dated April 2, 1974

Inventor(s) Thomas A. Harris

It is certified that error appears in the above-identified patent and that said Letters Patent are hereby corrected as shown below:

In the Specification, Column 2, line 57, "Q" should read -- Q̄ --. Column 3, line 6, delete "1" and insert -- of --.

Signed and sealed this 10th day of September 1974.

(SEAL)
Attest:

McCOY M. GIBSON, JR.
Attesting Officer

C. MARSHALL DANN
Commissioner of Patents